Feb. 1, 1966 C. B. PETERSEN ETAL 3,232,066
GRAVITATIONLESS LIQUID OXYGEN HANDLING SYSTEM
Filed Dec. 9, 1959 2 Sheets-Sheet 1

INVENTORS
CARL B. PETERSEN
ROBLEY V. STUART
BY
*William C. Babcock*
ATTORNEY

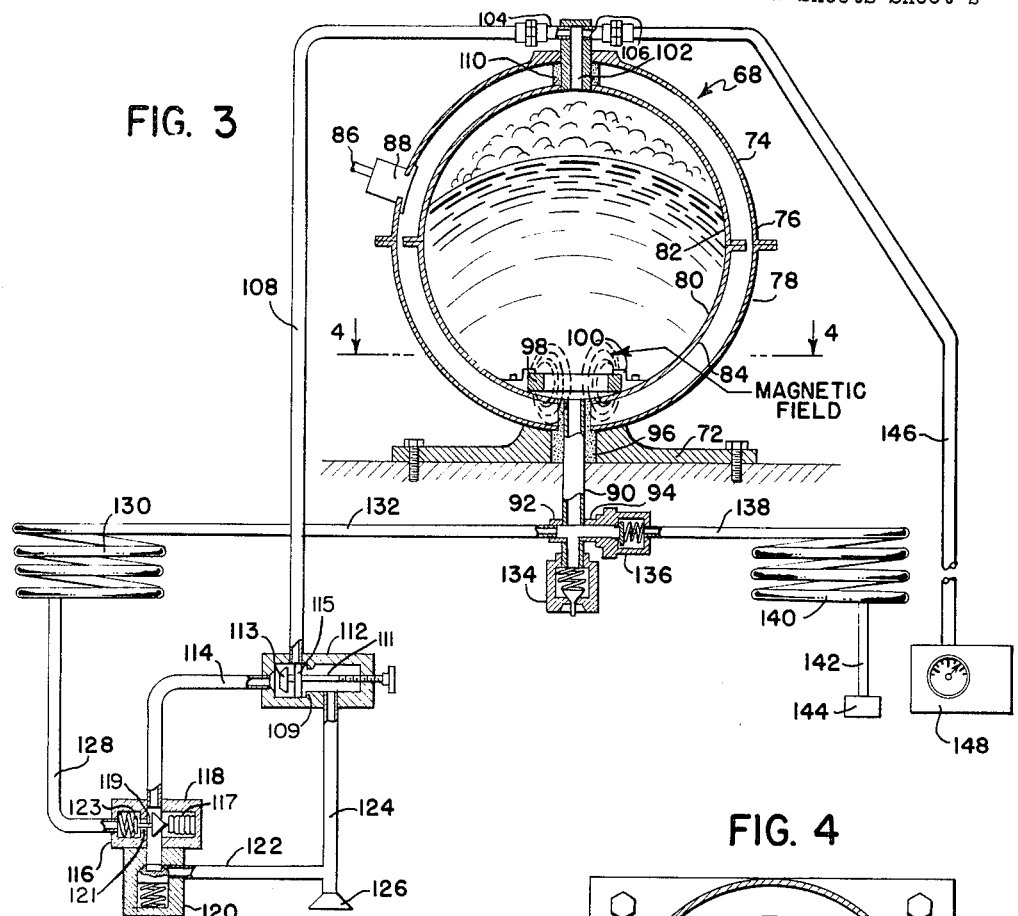
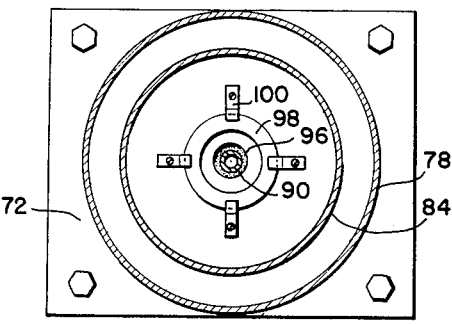
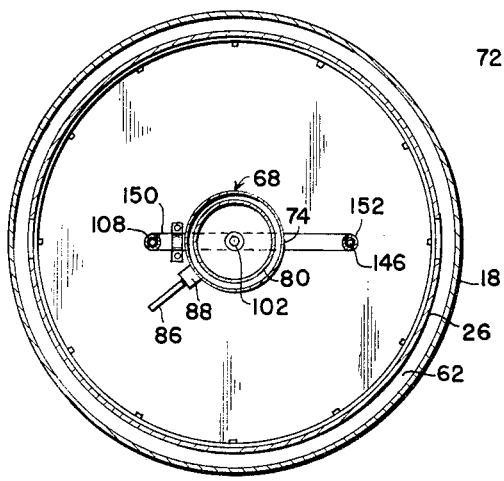
INVENTORS
CARL B. PETERSEN
ROBLEY V. STUART
BY
*William C. Babcock*
ATTORNEY

United States Patent Office 3,232,066
Patented Feb. 1, 1966

3,232,066
GRAVITATIONLESS LIQUID OXYGEN
HANDLING SYSTEM
Carl B. Petersen, New Brighton, and Robley V. Stuart, Minneapolis, Minn., assignors, by mesne assignments, to Litton Systems, Inc., Beverly Hills, Calif., a corporation of Maryland
Filed Dec. 9, 1959, Ser. No. 858,547
2 Claims. (Cl. 62—52)

The present invention relates to liquid oxygen converters and more particularly to liquid oxygen converters which can be used to supply gaseous oxygen to an occupant of a space vehicle in environments of zero gravity.

Space vehicles such as spaceships, satellites and the like must provide means of supplying oxygen to an occupant of the vehicle as said vehicle journeys through regions of space where there is little or no oxygen available in the surrounding atmosphere. Oxygen can be stored in either a liquid form or in a gaseous state. Since the volumetric ratio of liquid oxygen to gaseous oxygen is 1:860, oxygen can be stored at a much lower pressure in a liquid oxygen converter than in gas storage bottles; furthermore, a liquid oxygen converter will have a higher ratio of total contents to total weight than in gas storage bottles. Therefore it may be expedient, because of weight and space limitations in a space vehicle, to store oxygen in liquid form, rather than in a gaseous state, and to provide equipment for converting the liquid oxygen into gaseous oxygen so that it may be used by an occupant of the space vehicle.

According to the present state of the art there are liquid oxygen converter systems available which can be used in regions which are subject to the earth's gravity. However, to the best of our knowledge, there are no systems available which will satisfactorily work in a gravitationless environment or region of zero gravity. The liquid oxygen converters according to the known present state of the art fail to meet all the necessary requirements needed for space travel because in a gravitationless environment they are unable to separate gaseous oxygen, which may form within the liquid oxygen storing receptacle, from the liquid oxygen. Furthermore, in a gravitationless environment, there is no gravitational attraction which will maintain the liquid oxygen in the vicinity of outlet means provided in the receptacle for supplying liquid oxygen to the oxygen converter; therefore some means must be provided to maintain the liquid oxygen in the vicinity of said outlet means in the receptacle.

Accordingly one object of the invention is to provide a gravitationless liquid oxygen handling system which will efficiently separate gaseous oxygen from liquid oxygen in a receptacle and which will maintain the liquid oxygen in the vicinity of outlet means in said receptacle.

Another object is to provide for ready release of gaseous oxygen which may form and accumulate in a liquid oxygen storing receptacle.

A further object is to provide an oxygen handling system which will effectively convert liquid oxygen into gaseous oxygen in a gravitationless environment.

A still further object is to provide an oxygen handling system which will effectively convert liquid oxygen into gaseous oxygen so as to provide an adequate supply of gaseous oxygen to the occupant of a space vehicle, while said vehicle is in a gravitationless environment.

Another object is to provide a gravitationless oxygen handling system for use in a space vehicle which will take up only limited space and which will add minimum weight to the vehicle.

Other objects and advantages of the invention will become apparent from a consideration of the following specification and drawings in which:

FIG. 2 is a sectional view taken along line 2—2 of FIG. 1;

FIG. 3 is an enlarged schematic elevational view of an oxygen supply system which will convert liquid oxygen to gaseous oxygen;

FIG. 4 is a sectional view taken along line 4—4 of FIG. 3 showing the bottom portion of a liquid oxygen containing receptacle according to the invention.

Figure 1:
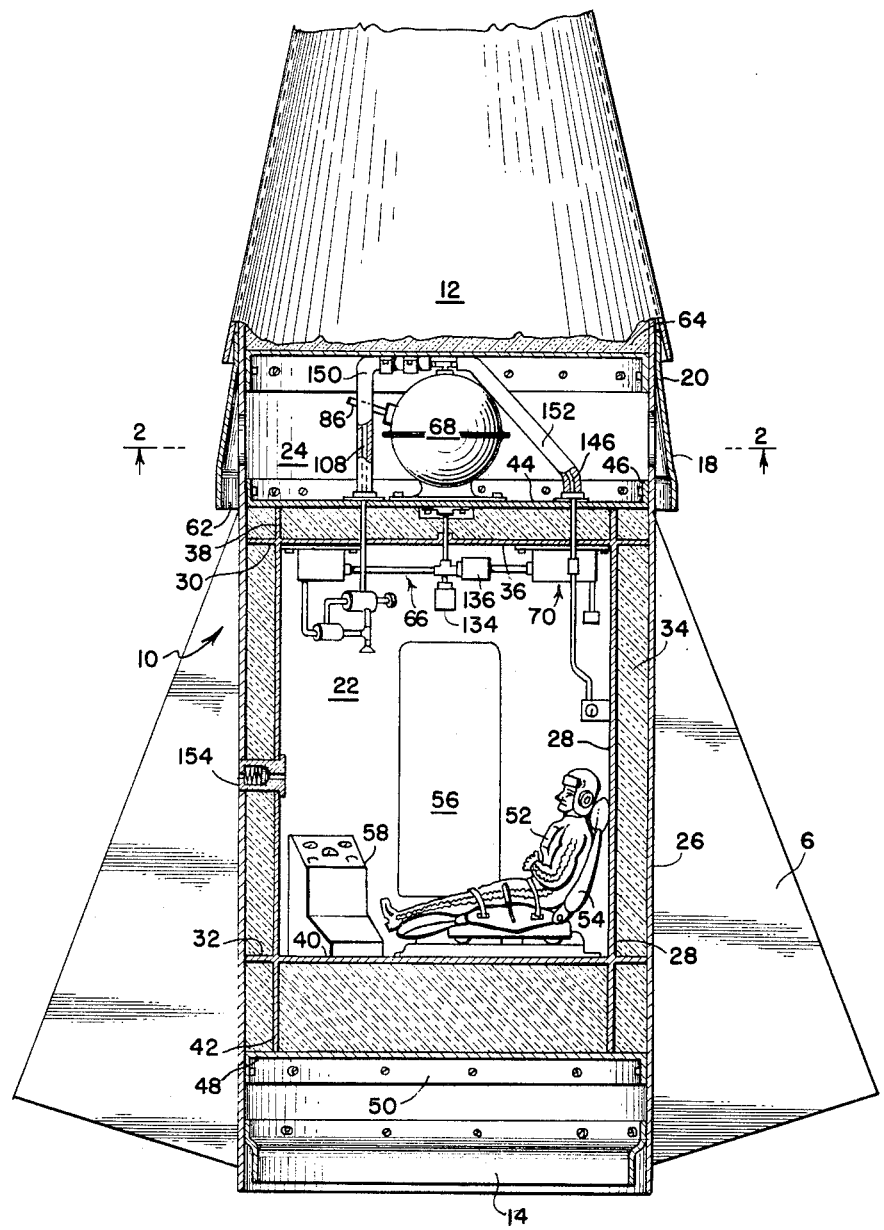
FIGURE 1 is a partial schematic elevational view of a compartmented space vehicle for transporting an occupant through space, including liquid oxygen storage means according to our invention.

Referring to FIG. 1, our invention is illustrated in connection with a space vehicle 10 comprised of several parts, including an upper portion or nose cone 12, a lower portion or capsule 14, fins 6, and a baffle 18.

The capsule 14 is comprised of a first compartment 22, and a second compartment 24. The first compartment 22 is comprised of an outer cylindrical wall 26, which comprises the outer surface of the space vehicle, and an inner cylindrical wall 28. The inner wall is separated from the outer wall by flanges 30 and 32. The inner wall 28 of the compartment has a top portion 36 and a bottom portion 40 secured thereto so as to form the hollow cylindrical body or compartment 22. Located above the top 36 and separated therefrom by a first band shaped extension 38, is a circular plate 44. Plate 44 is secured to the outer wall 26 of the vehicle by flange 46. Located below the bottom 40 and separated therefrom, by a second band shaped extension 42, is a second circular plate 48. Plate 48 is secured to the outer wall 26 of the space vehicle by flange 50. Insulating material, generally designated by the numeral 34 is provided to protect an occupant within the vehicle from temperature changes while said vehicle is traveling through space.

Located within the first compartment 22 of the space vehicle is an occupant 52, seated in chair 54. Door 56 is provided whereby said occupant may enter and leave the compartment. Suitable sealing means are provided so that the door may be sealed shut before the space flight begins. Also shown in the compartment is an instrument and control panel 58.

Located above the first compartment 22 of the space vehicle 10, is the second compartment 24. Baffle 18 encircles the second compartment (note FIG. 2) and is provided to deflect heated air as the space vehicle travels through the atmosphere. Said baffle is secured at one edge 20, to the space vehicle, and it has a substantially greater diameter at its other edge, so as to form an annular opening 62 around the space vehicle 10.

As the space vehicle 10 journeys through space, and particularly in regions of greater density, the nose cone 12 may become heated because of the friction created in traveling through the atmosphere. A heat barrier 64, comprised of suitable insulating material, is therefore provided to aid in maintaining the temperature within the second compartment 24 at as low a temperature as possible.

Located within space vehicle 10 is an oxygen supply system which is designated generally by the reference numeral 66, for providing oxygen to the occupant of said space vehicle. While we have only shown one such system in our drawings, it would be possible to include a number of such systems, which could either operate independently or co-operatively. The oxygen supply system is comprised of two parts, a liquid oxygen containing receptacle 68, which is located within the second compartment 24, and a converting system. An example of a converting system which could be satisfactorily used is shown in detail in FIG. 3, and is designated by the reference numeral 70. Said converting system 70 includes the evaporator coils, conduits, valves and the like, and is used to change the liquid oxygen into gaseous oxygen so that it may be used by the occupant within the space vehicle.

As stated hereinbefore, the liquid oxygen converters according to the known present state of the art fail to meet all the necessary requirements which are needed to enable them to perform satisfactorily in regions of zero gravity. The present invention utilizes a magnet (referred to by number 98 hereinafter) which is appropriately located with respect to the receptacle inlet or outlet, for effectively separating the gaseous oxygen from the liquid oxygen. In this example, the magnet is located for maintaining the liquid oxygen in the vicinity of the desired outlet means in said receptacle. The magnet within the receptacle sets up a field of magnetic flux which will attract paramagnetic substances. Oxygen is a paramagnetic substance, and it will be attracted by the magnetic field. Liquid oxygen, as compared to gaseous oxygen, has a higher paramagnetic susceptibility ($3.46 \times 10^{-3}$) than gaseous oxygen ($1.79 \times 10^{-6}$) and it will be more strongly attracted into the magnetic field.

Referring to the drawing of FIG. 3, the storage system of our invention is more clearly illustrated in combination with the converting system of FIG. 1, in an enlarged view. The receptacle 68 is shown as being substantially spherical in shape and is comprised of an outer wall or sphere 74, and an inner wall or sphere 80. The outer wall 74 is comprised of two hemispherical sections 76 and 78, and the inner wall 80 is comprised of two hemispherical sections 82 and 84. The hemispherical sections of each sphere are joined together by suitable means such as welding, and are sealed to maintain them air tight. The receptacle is mounted to a base member 72 which in turn is mounted to the plate 44. While we have shown our preferred embodiment as being spherical in shape it is not our intention to be restricted to said shape. The spherical shape is used to provide greater strength characteristics; however, it is to be understood that there are other shapes which could be satisfactorily used as well.

The inner sphere 80 is filled with liquid oxygen. It is essential that heat input to the liquid oxygen be kept to a minimum to prevent said liquid oxygen from evaporating and forming excessive gaseous oxygen within the receptacle. If excessive gaseous oxygen is formed within the receptacle, means must be provided for releasing the gas, so as to prevent an excessive pressure from being created within the receptacle. If an excessive pressure is created within the receptacle, an explosion could occur and cause considerable damage, not only to the space vehicle, but to the occupant as well.

A vacuum is the best insulator against heat transfer by conduction; therefore, the outer wall 74 and inner wall 80 of the receptacle 68, are separated from each other by a vacuum.

The pressure in outer space is appreciably lower than the pressure in a commonly used insulating vacuum, the latter having a pressure of about $10^{-5}$ mm. Hg. By providing a conduit 86 from the vacuum between the two walls of the receptacle 68, to the ambient environment, it is possible to reduce the pressure between the two walls of said receptacle to a lower pressure when the receptacle is in regions of zero gravity. Valve 88, which may be either manually or automatically actuated, is secured to the conduit and can be opened at a desired time. While the space vehicle is in regions of higher pressure, valve 88 will normally be closed; however, as the vehicle enters regions of lower pressure, valve 88 will be opened and a more perfect vacuum between the two walls of the receptacle 68 will be obtained.

The receptacle 68 is located within the second compartment 24 so as to aid in maintaining it at as low a temperature as possible. Referring to receptacle 68 as shown in FIG. 3, outlet 90 is provided to permit the liquid contents within the receptacle to be removed. Said outlet is securely positioned in the receptacle by suitable means such as welding, and is sealed as shown at 96 to prevent leakage from within the receptacle.

Located substantially around the outlet 90 is the magnet 98 which is secured in a stationary position by means of brackets 100. Said brackets are attached to the interior of the inner wall 80 of the receptacle. While we have shown the magnet as being a permanent magnet and as being annular in shape, it is not our intention to be restricted to the use of such a magnet. It is to be understood that other types, shapes or configurations of magnets could be used as well.

Located substantially opposite from the outlet 90 is a relief port 102 for releasing gaseous oxygen which may form within the receptacle. Said port is securely positioned in the receptacle by suitable means such as welding and is sealed as shown at 110 to keep the receptacle air tight. Relief port 102 has two outlets 104 and 106. Attached to outlet 104 is a conduit 108, which has connected thereto a build-up and vent valve 112. Valve 112 may be either manually operated by actuating rod member 111, as shown in the drawing, or it may be actuated by means of a pressure sensitive device, timing device or the like. Valve 112 has two conduits extending therefrom, a first conduit 124, which has secured thereto a diffuser 126, and a second conduit 114. Attached to conduit 114 is a valve 116 which comprises a pressure closing valve 118 and a pressure relief valve 120. Valve 118 includes a bellows 117, a member 119 which is freely movable in opening 121, and a cap 123 secured to member 119. Pressure relief valve 120 is connected to conduit 124 by means of conduit 122. Connected to pressure closing valve 118 is a conduit 128, which is integrally connected to one end of a pressure build-up coil 130. Integrally connected to the second end of coil 130 is a conduit 132 which is attached to the outlet 90 by means of a first connection 92.

Attached to the protruding end of the outlet 90 is a filler valve 134. Said valve is used for filling the receptacle 68 with liquid oxygen. Outlet 90 has a second connection 94 for attaching a check valve 136. Valve 136 has connected thereto a conduit 138, which is integrally connected to one end of an evaporating coil 140. Integrally connected to the second end of said evaporating coil is a conduit 142 which has attached thereto a pressure regulator 144.

Attached to the second outlet 106 of the relief port 102 is a conduit 146. Conduit 146 has attached thereto a pressure gauge 148 which is used to indicate the amount of pressure within the receptacle.

Conduits 108 and 146 are provided with insulating material 150 and 152 respectively (note FIG. 1) to protect said conduits from temperature changes. As further noted in FIG. 1, a pressure sensitive valve 154 is provided in the first compartment 22 for regulating the pressure within said first compartment. Said valve extends through the wall of the space vehicle 10 and is pre-set to vent air within the vehicle to the atmosphere when a certain pressure is reached therein.

Having described my invention, reference will now be made to the manner of converting liquid oxygen within the receptacle into gaseous oxygen so that it may be used by the occupant of the space vehicle.

The liquid oxygen receptacle 68 is filled with liquid oxygen through the filler valve 134 while the vehicle 10 is on the ground. During this operation, the build-up and vent valve 112 will be in the "vent" position (plunger 113 and valve head 115 are secured to member 111 and will be moved to the left as viewed in FIG. 3). Valve 112 is maintained in the vent position while the oxygen supply system 66 is not meant to be used; this permits any gas which may form and accumulate within the receptacle 68 to be released into the compartment 22.

During the initial stages of the flight there will be a sufficient amount of oxygen within the compartment 22 so that it is unnecessary to use the oxygen supply system 66. As the oxygen within the compartment is used by the occupant, and the pressure within said compartment decreases, the oxygen supply system will be put into operation, either manually by the occupant or by suitable automatic means, i.e., the system could be put into operation by means of a pressure sensitive device which would be actuated when a certain pressure within the compartment is reached.

If the system is to be put into operation by the occupant, a dial or gauge located on the instrument panel will indicate the amount of pressure within the compartment and thus signify when the occupant should actuate the necessary valves.

For purposes of illustration, the system will be put into operation by the occupant. The occupant actuates the build-up and vent valve 112 so that it is in the "build-up" position, (plunger 113 and valve head 115 are moved to the right as viewed in FIG. 3) and gas which forms within the receptacle is not vented through conduit 124 and diffuser 126. Liquid oxygen flows from the receptacle 68 into the evaporator build-up coil 130. The liquid oxygen absorbs heat during movement through conduit 132 and evaporator coil 130, and is converted in said coil into gaseous oxygen. The oxygen, which is now in a gaseous state, passes through conduit 128, valve 116 (and more particularly pressure closing valve 118) and into the build-up and vent valve 112. As stated above, valve 112 is in the "build-up" position and the gaseous oxygen is now permitted to pass through conduit 108 into the top of the receptacle 68. Pressure within the system increases until a predetermined pressure has been attained. Pressure closing valve 118 will close when said predetermined pressure has been reached, and the pressure within the system is maintained at a constant pressure. If an excessive pressure is created within the receptacle and system, gaseous oxygen is vented into the compartment 22 through pressure relief valve 120, conduit 122 and diffuser 126.

The pressure at which the system is to be maintained may vary, depending upon various conditions. It has been determined that a pressure of about 90 p.s.i. would be satisfactory to provide sufficient oxygen to an occupant. It must be understood that the greater the pressure within the system, the greater will be the thickness required for the container walls, conduits and the like, and of course this will add weight to the system and to the vehicle.

As the pressure in the system increases, liquid oxygen also flows through check valve 136 into the evaporator coil 140. The liquid oxygen absorbs heat during movement through conduit 138 and coil 140, and is converted into gaseous oxygen in said coil. The gaseous oxygen then passes through pressure regulator 144 into the compartment 22.

If the pressure within the compartment increases above a desired amount, pressure relief valve 154, which has been referred to hereinbefore, and which is included as a safety feature, will release gas to the atmosphere. Valve 154 will thus maintain the pressure within the compartment equal to or below a desired maximum.

The storage tank embodiment described above has been provided with a permanent magnet 98 in the receptacle 68 as a source of flux. Liquid oxygen is drawn toward the magnet, and gaseous oxygen, if there is any present, is forced away from the magnet by the more paramagnetic liquid oxygen. Inclusion of the magnet serves a two-fold purpose; first, it substantially separates the gaseous oxygen from the liquid oxygen, and second, it maintains the liquid oxygen in the vicinity of the outlet 90.

Gaseous oxygen is separated from the liquid oxygen so that it may be removed from the receptacle 68 through the relief port 102, and thus prevent an undue pressure from being created in the receptacle. Furthermore, if the liquid oxygen were substantially mixed with the gaseous oxygen, it would flow through the relief port 102 when excess pressure is being relieved and thus the oxygen supply would be rapidly depleted.

Liquid oxygen is maintained in the vicinity of the outlet 90 to provide a ready supply to the evaporator 140. In a gravitationless environment, the liquid oxygen might not remain in the vicinity of the outlet, but might shift to another position, away from said outlet. If the liquid oxygen shifts away from the outlet, the evaporator coil might not receive an adequate supply of liquid oxygen and the system may fail or be extremely inefficient. Provision of the magnet 98 above the outlet 90 maintains the liquid oxygen in the vicinity of said outlet and avoids these problems.

In the above description and attached drawings a disclosure of the principles of this invention is presented, together with some of the ways in which the invention may be practiced.

We claim:

1. In a space vehicle for transporting an occupant through space having a heated compartment and an unheated compartment, and means for supplying oxygen to an occupant in said heated compartment, said means comprising an improved oxygen handling system adapted for use in a gravitationless environment, said system including a receptacle for containing liquid oxygen and gaseous oxygen, said receptacle being located within the unheated compartment, said receptacle having first outlet means for removing said liquid oxygen and second outlet means for releasing excessive gaseous oxygen from the receptacle, said second outlet means located at a position substantially opposite to that of the first outlet means, permanent magnet means disposed within the receptacle in close proximity to said first outlet means for substantially separating gaseous oxygen from liquid oxygen and for maintaining the liquid oxygen in the vicinity of said first outlet means regardless of the orientation of the receptacle, and converting means associated with the receptacle for transforming the liquid oxygen into gaseous oxygen as said liquid oxygen is removed from the receptacle.

2. A space vehicle for transporting an occupant through space comprising in combination a heated compartment, an unheated compartment, and means for supplying oxygen to an occupant in the heated compartment, said means comprising an improved oxygen handling system adapted for use in a gravitationless environment, said system including a receptacle for containing liquid oxygen and gaseous oxygen, means for maintaining said receptacle in the unheated compartment of said vehicle, said receptacle having first outlet means for removing the liquid oxygen from the receptacle and second outlet means for releasing gaseous oxygen from the receptacle, said second outlet means located at a position substantially opposite to that of the first outlet means, pressure responsive means for controlling the release of said gaseous oxygen from the receptacle, permanent magnet means disposed within the receptacle in close proximity with said first outlet means for substantially separating gaseous oxygen from liquid oxygen and for maintaining the liquid oxygen in the vicinity of said first outlet means regardless of the orientation of the receptacle, and evaporator means located within the heated compartment for converting the liquid oxygen into gaseous oxygen as said liquid oxygen is removed from the receptacle.

References Cited by the Examiner

UNITED STATES PATENTS

| | | | |
|---|---|---|---|
| 1,273,929 | 7/1918 | Morrison | 62—11 |
| 2,657,542 | 11/1953 | Wildhack | 62—53 |
| 2,873,582 | 2/1959 | Green | 62—52 |
| 2,877,966 | 3/1959 | Summers | 244—59 |

ROBERT A. O'LEARY, *Primary Examiner.*

MILTON BUCHLER, PERCY L. PATRICK, *Examiners.*